March 26, 1929.　　　L. G. TAYLOR　　　1,707,100
MACHINE FOR CUTTING OFF LENGTHS FROM BARS
Filed Dec. 30, 1927　　　3 Sheets-Sheet 1
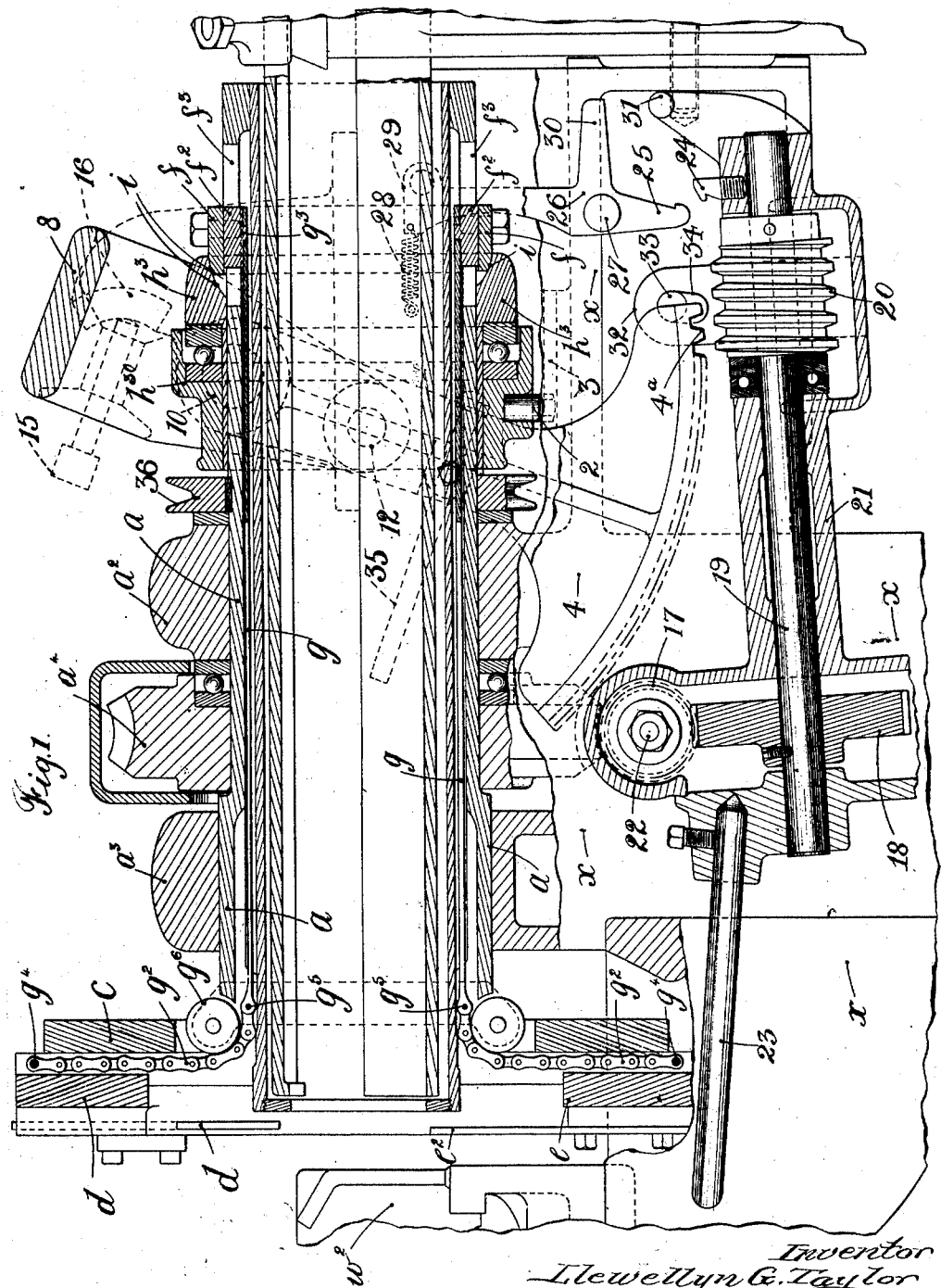

March 26, 1929.   L. G. TAYLOR   1,707,100
MACHINE FOR CUTTING OFF LENGTHS FROM BARS
Filed Dec. 30, 1927   3 Sheets-Sheet 2
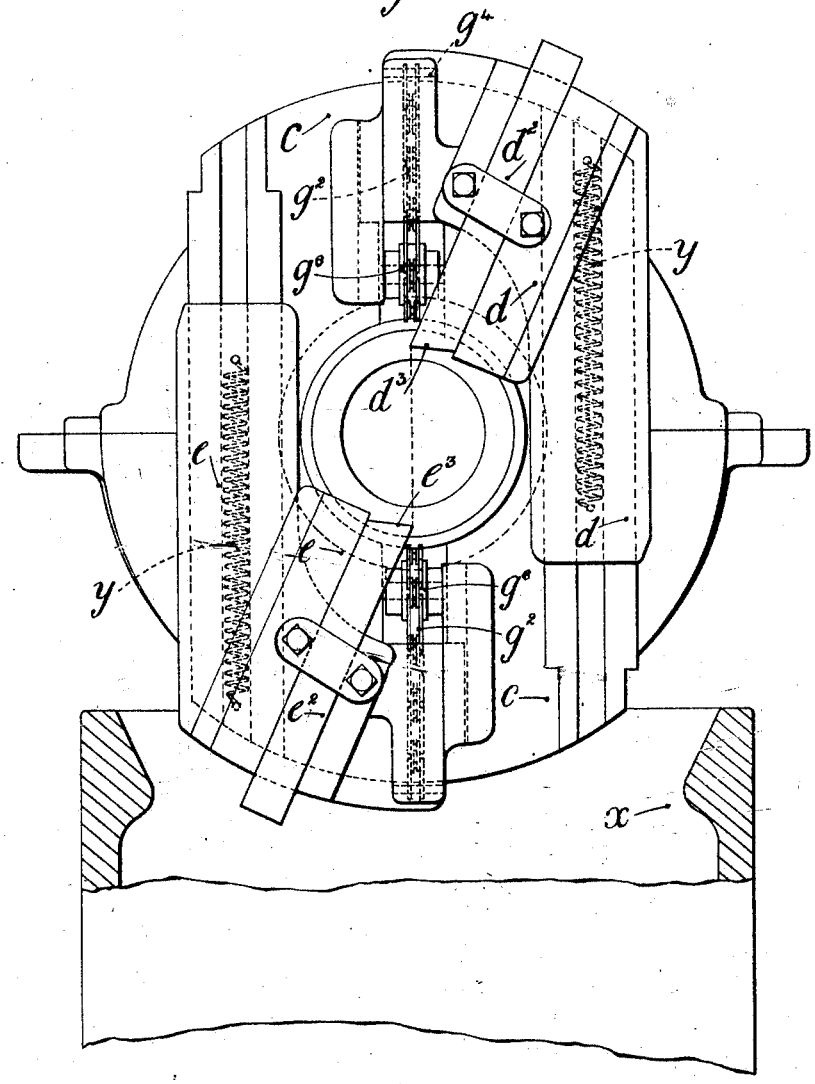

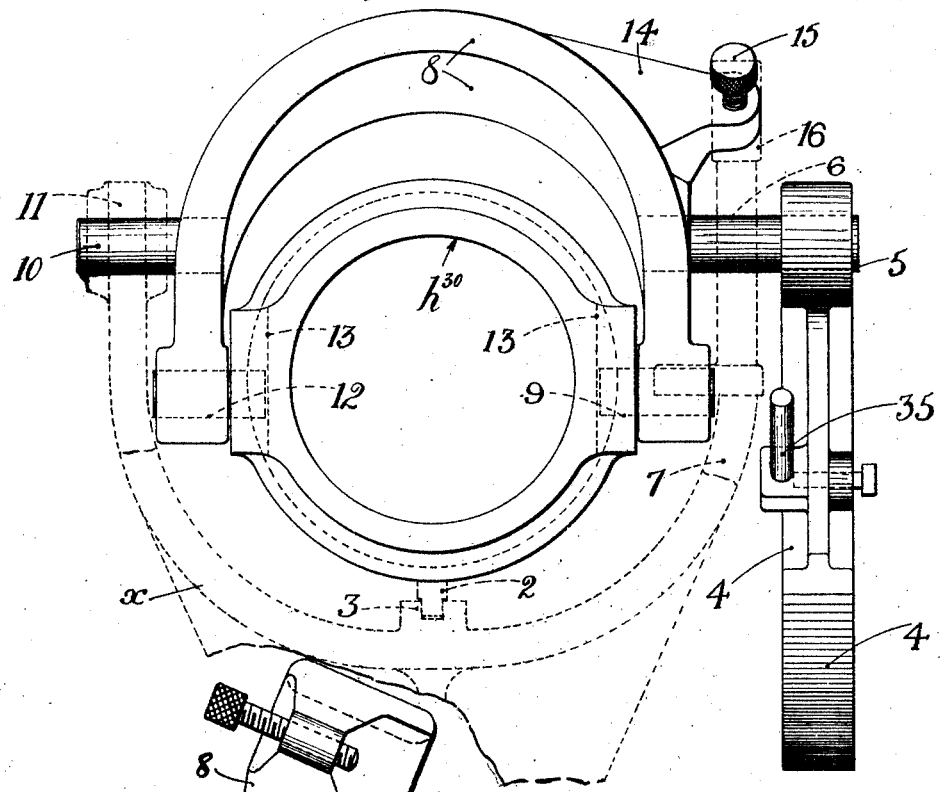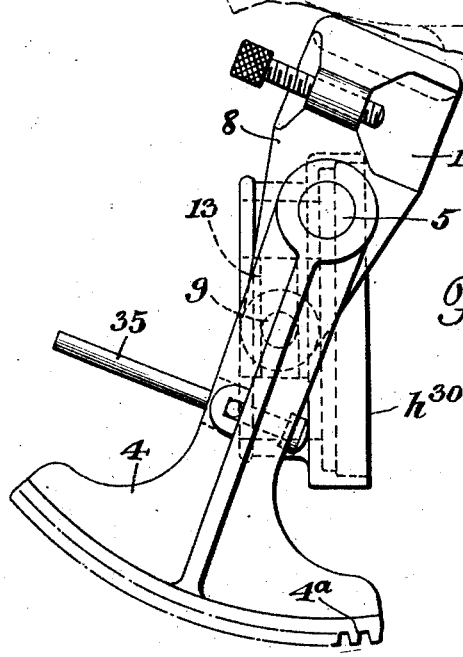

Patented Mar. 26, 1929.

1,707,100

UNITED STATES PATENT OFFICE.

LLEWELLYN GEORGE TAYLOR, OF BIRMINGHAM, ENGLAND.

MACHINE FOR CUTTING OFF LENGTHS FROM BARS.

Application filed December 30, 1927, Serial No. 243,640, and in Great Britain June 17, 1927.

This invention relates to a machine for cutting off lengths or pieces from solid or hollow metal or other bars, and in which tools similar to turning tools are used. The bar to be operated upon is held stationary, as in a vice positioned in front of the tools, and the latter are carried by slides mounted to revolve with a spindle axially in line with the bar, the tools moving around the work and being fed up to it radially by the slides. Means are provided whereby the two or more cutting tools are coupled and are connected to a single and common feed so that the operation of all the tools on the work is equal and compulsory by the use of the work as a raigid equalizing abutment. Such a machine is described and illustrated in the British Letters Patent No. 25,223 of 1910.

This invention provides improvements in a cutting off machine, combining a hollow spindle revoluble in stationary bearings and driven by a worm wheel, carrying a face plate tool provided with slides movable radially on the face plate outwardly by springs and inwardly by a rockable and slidable ring. This ring is mounted over the rear end of the hollow spindle to revolve a slidable abutment ring against which the rockable ring forwardly bears and is revoluble with the spindle, a yoke rockable on the frame of the machine being provided to slide the abutment ring, there being a toothed sector movable with the yoke, and hand-operated means swingable on the frame of the machine driven from the worm wheel to engage the toothed sector to rock it. There are also provided devices for automatically holding said means in engagement and for automatically releasing the same, the entire combination providing a machine of the type according to the British Letters Patent, hereinbefore referred to, designed for manual starting and automatic stopping.

In the drawings:

Fig. 1 is a longitudinal, vertical, sectional elevation.

Fig. 2 is a front elevation.

Fig. 3 is a detail of two of the principal parts of Fig. 1.

Fig. 4 is a left-hand end elevation of Fig. 3 but with an additional part of the frame of the machine shown in dotted lines.

With reference to the drawings, $a$ represents the hollow spindle which, at its forward end, carries on a face plate $c$ the two slides $d$ and $e$, upon each of which is detachably fitted a cutting tool, indicated at $d^2$ and $e^2$. The spindle has bearings at $a^2$, $a^3$, within the frame $x$ of the machine, and is revolved by the worm wheel $a^4$. The slides $d$ and $e$ move across the face plate so that the cutting edges $d^3$, $e^3$, of the tools advance and recede radially in respect to the axis of the machine, said slides being each provided at $y$ with a coiled spring for automatically causing the tools to retire. Upon the back end of the hollow spindle $a$ is provided an axially slidable ring $f$ revoluble at all times with the spindle. To cause said ring to so revolve there are rigidly attached to it the blocks $f^2$ which engage corresponding slots $f^3$ formed through the walls of the hollow spindle, the ring being externally mounted upon the spindle so that it can rock to bring its axis inclined to the axis of the spindle. To the blocks $f^2$ of this ring, and, therefore, to the ring itself, the two slides $d$ and $e$ are connected by two connectors which are each partly a steel strip $g$ and partly a piece of cycle chain $g^2$, the steel strip connecting with the block at $g^3$, and the cycle chain with the slide at $g^4$ and with each other at $g^5$, the right-angled bend in each connector being taken care of by passing round a roller $g^6$ which is pivoted to the forward end of the hollow spindle $a$. A movement of the ring $f$ rearwardly parallel with the axis of the machine pulls both slides $d$ and $e$ and the tools they carry inwardly, equally and simultaneously towards the work, which is a bar gripped in any form of vice $w^2$, fitted to the extreme front of the machine, to be held while a piece is being cut from it.

The ring $f$ is automatically pulled forwardly by the springs $y$ of the two slides $d$ and $e$, and rearwardly against the action of said springs it is slid from the operation of an abutment ring $h^3$ mounted over the spindle to slide axially of the machine and to rotate therewith and with the ring $f$. In front of the abutment ring $h^3$ is a non-rotatable ring $h^{30}$ loosely mounted over the spindle to slide axially of the machine without at any time rotating with the spindle, being held from rotation by a peg 2 carried by the ring, engaging a groove 3 of the frame $x$. The engagement between the ring $f$ and the ring $h^3$ is by opposed spherical surfaces $i$ which, without separating at any time, permit of the ring $f$ rocking in addition to sliding, so that its axis may become inclined or parallel to the axis of the machine. The opposing surfaces $i$ have the effect of permitting the ring $f$ to rock at any time while it is being forced rearwardly by the ring $h^3$ to advance the slides $d$ and $e$. The rocking action of the ring $f$ is for equalizing the work on the two tools $d^2$ and $e^2$, using the work as a rigid abutment so that both tools cut together and equally.

All the aforesaid is substantially in accordance with the prior British patent referred to except for the drive to the spindle by the worm wheel $a^4$ and the peg 2 to hold the ring $h^{30}$ from rotation.

The invention provides the machine with the following additional features.

4 is a toothed sector or arm mounted to swing with a trunnion 5 having a bearing at 6 within a forked branch 7 of the frame $x$ of the machine. This trunnion 5 connects inwardly of the bearing with a rigidly built rockable yoke 8 which, by a peg 9, connects with the slidable and non-rotatable ring $h^{30}$, so that when the yoke is rocked from the sector 4 the rings $h^{30}$ and $h^3$ are moved along the hollow spindle $a$. The yoke has a trunnion 10 opposite to the trunnion 5 working within an opposite branch 11 of the frame $x$ as a bearing, and connects with the ring $h^{30}$ oppositely by a peg 12 similar to the peg 9, so that the rocking of the yoke 8 imparts equal movement to the ring $h^{30}$ on both sides, the pegs 9 and 12 being carried by the yoke and moving at their inner end in vertical gaps or slots 13 of the ring $h^{30}$.

The yoke 8 has at one side thereof a rigid extension 14 carrying a screw pin 15 operative against an abutment 16 of the frame $x$, so that the yoke 8, and, therefore, the toothed sector 4, can be limited in their combined swing in one direction, the screw pin 15 giving an adjustment as to extent of swing in such direction.

The worm wheel $a^4$ is driven by a worm mounted upon the same shaft as the worm 17, which drives a second worm wheel 18 mounted upon a short shaft 19, to the other end of which short shaft a second worm 20 is attached for meshing with the teeth $4^a$ of the toothed sector 4. While the machine is running the shaft 19 is continuously revolving. The shaft 19 and the parts carried thereby are mounted within a framing 21 swingable bodily about the axis 22 of the worm 17, so that said frame and the shaft 19, and the parts carried thereby, can swing in the vertical plane about the axis 22 to engage and disengage the worm 20, from the toothed sector 4. The worm 20 while revolving, is moved into engagement with the toothed sector by hand, and is automatically held in such engagement until the cutting tools have finished their work, when the worm 20 automatically falls from the toothed sector out of gear.

These operations are carried out in the following manner:—

A hand bar 23 is used for swing the worm 20 into gear with the toothed sector 4. When this takes place the frame 21, by a hook 24, engages a catch arm 25 of a lever 26, pivoted at 27 to the frame of the machine and moved in one direction by a coiled spring 28 applied to its longer arm 29. An extension arm 30 also forms part of this lever 26 and coacts with an extension 31 upon the frame 21 to forcibly disengage the worm 20 from the toothed sector in case the weight of the frame 21, et cetera, should be insufficient for said disengagement. The downward swing of the frame 21 is limited by an extension 32 of said frame engaging a stationary peg 33 of the main frame $x$, this peg also limiting the upward swing of the frame 21 by the slot 34 which the peg 33 engages.

The toothed sector 4 carries as part thereof an adjustable pusher 35, whose purpose is to knock the catch arm 25 out of action at the finish of the cutting off operation to release the hook 24 so that the worm 20 may fall out of gear from the toothed sector 4, and if there should be any sticking it will forcibly remove the worm from the sector. As the toothed sector finishes its swing, the adjustable pusher 35 operates against the arm 29 of the lever 26, and removes the catch arm 25 from the hook 24, immediately afterwards causing the extension arm 30 to operate against the extension 31 if the worm 20 has not fallen away from and is disengaged from the teeth of the sector.

Fig. 1 shows the parts of the machine in normal positions. Assuming the pusher 35 has been adjusted to the desired operation of the tools, the worm 20, while revolving, is swung upwardly by hand into engagement with the teeth of the toothed sector, so that the hook 24 and the catch 25 engage. This immediately causes the sector 4 to swing with its trunnions 5 and 10 to move the rings $h^{30}$ and $h^3$ and put on the cut at the tools, maintaining said cut until the pusher 35 strikes the arm 29 of the lever 26, when the catch arm 25 will disengage the hook 24 and allow the worm 20 to fall away from the toothed sector out of gear, or, failing this, causing said worm to be forcibly moved out of gear, the worm 20 revolving the entire time.

It will be quite clear from what has been previously described how the movement of the rings $h^{30}$ and $h^3$ operates upon the ring $f$, and how the surfaces $i$ between these two parts operate to equalize the cut of the tools on the work, using the work as an equalizing abutment.

The toothed sector 4 is moved to normal position in relation to the worm 20 as represented in Fig. 1 by the springs $y$ in the tool slides, said springs causing the tools to recede immediately the worm 20 has become disengaged from the toothed sector 4, pulling forwardly the rings $f$, $h^3$ and $h^{30}$, and, therefore, swinging the toothed sector.

The pulley 36 revolves with the spindle $a$ and is utilized for driving a suds pump for feeding suds to the tools.

Having now described my invention, what I claim and desire to secure by Letters Patent is—

1. A machine for cutting off lengths from bars, including a hollow spindle revoluble in stationary bearings and driven by a worm wheel and carrying a face plate, tool slides movable radially on the face plate, springs for moving said slides in one direction, a rockable and slidable ring mounted over the rear end of the hollow spindle to revolve therewith, means connecting the ring and slides so that the ring moves the slides in opposite directions to the springs, a slidable abutment ring against which the rockable ring forwardly bears and which is revoluble with the spindle, a yoke rockable on the frame of the machine to slide the abutment ring, a toothed sector movable with the yoke, hand-operated means swingable upon the frame of the machine and driven from the worm wheel to engage and rock the toothed sector, and devices for automatically holding said means in engagement with the toothed sector and for automatically releasing said engagement.

2. A machine for cutting off lengths from bars including a hollow spindle revoluble in stationary bearings and driven by a worm wheel and carrying a face plate, tool slides movable radially on the face plate springs for moving said slides outwardly, a rockable and slidable ring connected to the slides for moving the slides inwardly, said ring being mounted over the rear end of the hollow spindle to revolve therewith, a slidable abutment ring against which the rockable ring forwardly bears and which is revoluble with the spindle, a yoke rockable on the frame of the machine to slide the abutment ring, a toothed sector mounted upon a trunnion of the yoke, a hand-operated swingable frame pivoted to the frame of the machine and carrying a short shaft and two worms the one to gear with the worm wheel and the other with the toothed sector, and devices for automatically holding the one worm in engagement with the toothed sector and for automatically releasing same at the end of a traverse.

3. A machine for cutting off lengths from bars, including a hollow spindle revoluble in stationary bearings and driven by a worm wheel and carrying a face plate, tool slides movable radially on the face plate, springs for moving said slides outwardly, a rockable and slidable ring connected to the slides for moving the slides inwardly, said ring being mounted over the rear end of the hollow spindle to revolve therewith, a slidable abutment ring against which the rockable ring forwardly bears and which is revoluble with the spindle, a yoke bifurcating the spindle and rockable on the frame of the machine to slide the abutment ring, a toothed sector mounted upon a trunnion of the yoke, a hand-operated swingable frame pivoted to the frame of the machine and carrying a short shaft upon which is mounted a worm and a worm wheel, the worm to engage the teeth of the toothed sector, a worm mounted on the point of pivoting of the frame to gear with the worm wheel on the short shaft, and with the worm wheel on the machine spindle, a catch on the free end of the swingable frame, a pivoted catch on the frame of the machine to engage the former catch, a spring to maintain the pivoted catch in one position, and an adjustable pusher carried by the toothed sector to operate upon the pivoted catch.

4. A machine for cutting off lengths from bars, including a hollow spindle revoluble in stationary bearings and driven by a worm wheel and carrying a face plate, tool slides movable radially on the face plate outwardly by springs and inwardly by a rockable and slidable ring mounted over the rear end of the hollow spindle to revolve therewith, flexible connections between the rockable ring and the slides, a slidable abutment ring against which the rockable ring forwardly bears and revoluble with the spindle, a yoke rockable on the frame of the machine to slide the abutment ring which carries a toothed sector, and hand-operated means swingable upon the frame of the machine and driven from the worm wheel to engage the toothed sector for rocking said sector.

In testimony whereof I have affixed my signature.

LLEWELLYN GEORGE TAYLOR.